Feb. 7, 1933.  W. E. HUFFMAN  1,896,175
DEVICE FOR TRAINING PILOTS IN HANDLING AIRPLANES
Filed June 11, 1929  4 Sheets-Sheet 1

INVENTOR
William E. Huffman.
BY
Robert H. Young
ATTORNEY

Feb. 7, 1933.  W. E. HUFFMAN  1,896,175
DEVICE FOR TRAINING PILOTS IN HANDLING AIRPLANE
Filed June 11, 1929  4 Sheets-Sheet 2

INVENTOR
William E. Huffman.
BY Robert H. Young
ATTORNEY

Patented Feb. 7, 1933

1,896,175

UNITED STATES PATENT OFFICE

WILLIAM E. HUFFMAN, OF DAYTON, OHIO, ASSIGNOR TO THE AIRCRAFT APPLIANCE CO., OF SPRINGFIELD, OHIO

DEVICE FOR TRAINING PILOTS IN HANDLING AIRPLANES

Application filed June 11, 1929. Serial No. 370,031.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

My invention relates to a device for training students to become airplane pilots and has for its objects to provide an improved construction that will simulate the movements of and resemble an airplane in flight so far as possible; that will impart to the student all of the sensations such as, the blast of air, the whirl of a propeller, the co-ordination and "feel" of the controls of an airplane in flight, and that will, at the same time, by reason of its being on the ground, give the student a feeling of security and more in particular, my invention has for its object to provide an improved construction of such a device which allows of supporting a fuselage provided with controllable steering surfaces, in such a manner that the fuselage may be moved or rotated to any position and in any direction at will by said control surfaces about three different axes. To these ends I provide a motive power source arrangement having propeller means operatively connected thereto for effecting an airstream in the region of the steering surfaces in any position of the fuselage which is pivoted to the inner ring of a pair of Cardan rings or gimbal support, the inner ring being pivoted to the outer ring about an axis at right angles to the pivoted axis of said fuselage and having mounted thereon a motor with a propeller operatively connected thereto, and means disposed in the region of an airstream or wind blast for preventing undesired rotational movements of the fuselage that may result from an airstream action.

It is a further object of my invention to provide improved means to prevent undesired rotation of the entire apparatus caused both by the counter torque of said motor when the inner ring and motor lie in a plane other than substantially horizontal and by the gyroscopic effect set up by the motor when the inner gimbal ring is rotated about its axis with the resulting change in the position of the motor axis. To this end I provide means to lock the outer ring against rotation when the counter torque and the gyroscopic effect set up by the motor is no longer resisted by the gimbal ring construction.

With the above objects in view the invention consists in the construction, combination and arrangement of parts as will be hereinafter more fully described.

Reference is to be had to the accompanying drawings forming part of this specification in which like reference characters indicate corresponding parts throughout the several views and in which.

Referring more particularly to the drawings the numeral 2 designates a fuselage which is supported by and rotatably mounted within an inner ring 4 which is mounted within an outer ring 6 and rotatable about an axis at right angles to the axis of rotation of the fuselage. The outer ring 6 is mounted on a stationary frame structure 8 and is capable of rotation about an axis at right angles to the axis of rotation of the inner ring. By supporting the fuselage 2 in this manner it will be apparent that the fuselage may be capable of assuming any position in space about a fixed point of reference.

The frame structure 8 is of the usual truss construction built sufficiently strong to withstand the loads when the device is in operation and comprises a pair of vertically disposed legs 10, each being shaped in the form of a tripod and said legs are interconnected by an upper horizontally disposed truss member 12 and a lower truss member 14 that is arranged parallel with and spaced apart from the upper truss member 12 to receive the gimbal support A. Each of the truss members 12, 14 is detachably secured to the legs 10, 10' by any suitable means such as bolts and nuts passing through the plates 16 that are welded to the truss members and legs respectively.

The leg 10 is provided with a ladder structure 18 and a platform 20 that is hingedly connected thereto as shown by numeral 22 for the purpose of getting into and out of the fuselage 2. When it is desired to get into or out of the fuselage, the platform is lowered to the position shown in dotted lines in Fig. 2 rotated by means of a cable 24 and pulley 26. The outer gimbal ring 6 is symmetrically disposed with respect to the upper and lower truss members 12, 14 and sufficiently spaced from the legs 10, 10' to permit the fuselage to assume any position without interference with the frame 8. The inner ring 4 is non-symmetrically mounted with respect to the outer ring in order that the overall length of the inner ring 4 and propeller 28 in any position of rotation of the inner ring about its axis will clear the outer ring.

Suitable supports are provided between the upper and lower truss members 12, 14 and the outer ring 6 as well as between the outer ring and inner ring 4 to permit the rings to rotate about their respective axes as above described. The supports are substantially alike in construction and a description of one will be sufficient for all. The support (Fig. 6) comprises a journal housing 30 and a bearing housing 32 each of which is clamped to the inner and outer rings respectively. The journal housing 30 consists of an inner clamping member 34 and an outer clamping member 36 that is provided with a centrally disposed hollow cylindrical sleeve 38 integral therewith and passing through a centrally disposed opening 40 in the inner clamping member 34. The inner and outer clamping members 34, 36 are provided with oppositely disposed recesses 42 at their outer edges for the reception of the tubular ring members 44 forming a part of the outer gimbal ring 6 and are rigidly secured together and to the rings by means of through bolts 46. The journal housing 30 consists of inner and outer similarly constructed clamping members 48 which are oppositely arranged and provided with opposing recesses 50 at their center to receive the bearing 50' and with recesses 52 at their edges to receive the tubular ring members 54 forming a part of the truss member 12. The journal support 32 is also provided with a centrally disposed opening 56 adapted to receive a journal shaft 58. In assembling the gimbal ring support A the inner and outer rings are maintained spaced apart by means of a spacing collar 60 interposed between the bearing 50' and the sleeve 38 and are aligned by means of the journal shaft 58 passing through the opening 56 and the hollow sleeve 38. The shaft 58 being keyed to the journal housing 30 at one end but free at its opposite end to permit of a relative movement between the inner and outer gimbal rings. The journal shaft 58 is hollow and is retained against endwise movement by means of an outwardly turned flange 62 formed thereon at one end and a lock nut 64 at the other end.

Figure 1:
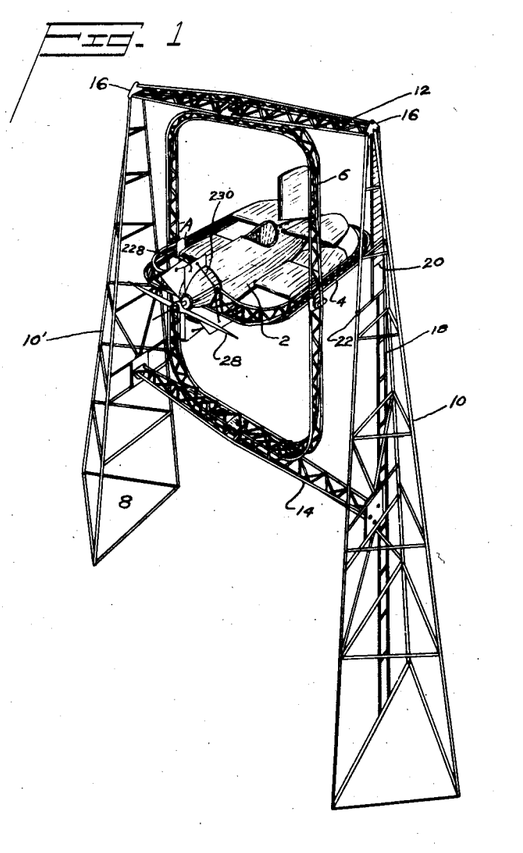
Fig. 1 is a perspective view of my invention with the fuselage stationarily suspended in horizontal position.
Figure 2:
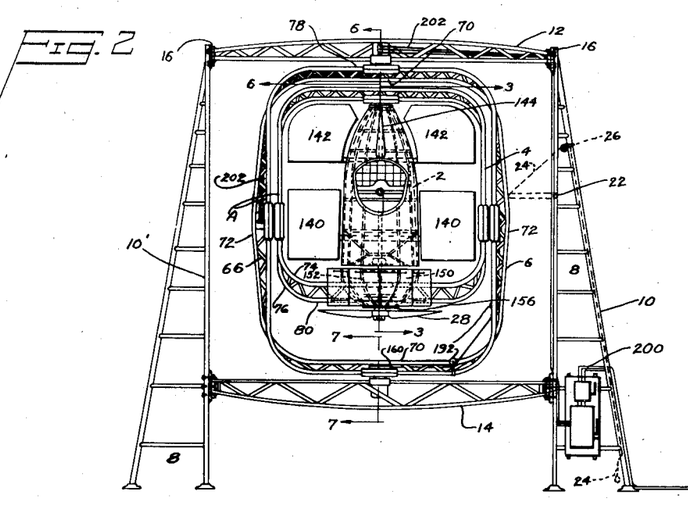
Fig. 2 shows an elevational view of my novel device with the fuselage presenting forwardly and disposed in a vertical position.

Referring to Fig. 2 the outer gimbal ring 6 which is substantially rectangular in shape and constructed of metal tubing consists of two similar ring members 44 which are parallelly arranged and spaced apart with their corresponding sides lying in corresponding planes. These two ring members are rigidly connected by cross braces 66 to each other and to an intermediate parallelly arranged tubular ring member 68 that is offset inwardly of the gimbal ring at its upper and lower ends 70 and outwardly of the gimbal ring at its sides 72.

The inner gimbal ring 4, Fig. 2 being formed of two parallelly arranged rings 74 and an intermediate ring 76 is constructed in substantially the same manner as the outer ring except that the intermediate ring member 76 has its ends offset only outwardly at the rear end 78 and forward end 80 of the gimbal ring. It will thus be seen that the inner and outer gimbal rings present flat surfaces at the points of pivotal connection with themselves and the outer frame.

A supporting housing for a motor 82 is formed on the end 80 of the inner gimbal by bending the rings 74 to form a circular support 84, the intermediate ring 76 having a portion cut off and being provided with a circular ring support 86 of substantially the same diameter as support 84 and being parallelly and axially aligned therewith.

The motor 82 is centrally disposed within and rigidly connected to the housing by means of bolts 88 passing through the flanges 90 of the motor casing and through the plates 92 that are welded to the supports 84, 86. The motor shaft 94 coincides or is aligned with the axis of rotation of the fuselage 2 and extends beyond the inner ring 4 for the purpose of operatively connecting the propeller 28 to the motor for effecting an air blast.

The cone-shaped fuselage 2 is made of metal tubing and comprises a plurality of longitudinally disposed tubular members 96 that are welded to a plurality of tubular uprights 98. These uprights are of circular formation varying gradually in diameter and having their axes in alignment. The longitudinal tubular members 96 gradually converge from the foremost upright 98 at one end of the fuselage and terminate in a bushing 100 at the other end. The bushing 100 is provided with a central opening adapted to receive a shaft 102 which is welded to the bushing 100 and rotatably mounted on the inner ring 4 in a bearing support 32 identical with that described above.

A plurality of braces 104 are welded at the fore end of the fuselage to the uprights 98 and to a bushing 106 for providing a bearing support for the fuselage. The bushing 106 is disposed within a ball bearing race 108 which is retained in place by a housing 110 that is welded to the motor casing.

The fuselage 2 is provided with a seat 112 positioned directly below the cockpit opening 114 and a safety belt 116 is attached thereto for securing the student or operator from falling out when the fuselage is tilted or inverted. The seat is positioned rearward of the axis of rotation of the ring 4.

Perfect balancing of the fuselage about its own axis and the axis of the inner gimbal ring when the student takes his seat is accomplished by a counterweight 118 for vertical balance and a counterweight 120 for horizontal balance. The counterweight 118 is slidably mounted upon a threaded rod 122 vertically disposed in a plane passing through the axis of the fuselage and is provided with guideways 124 to receive the guide rods 126. Suitable bearings (not shown) are provided for supporting the rod 122. The end of the threaded rod 122 is provided with a crank-wheel 128 which is readily accessible from the outside of fuselage. The arrangement for the horizontal balance is similar to that of the vertical balance except that the threaded rod 130 is horizontally disposed having its inner end 132 supported by a U-shaped plate 134 that is connected to the rods 126 and its outer end 136 passing through the bearing support 32.

Figure 4:
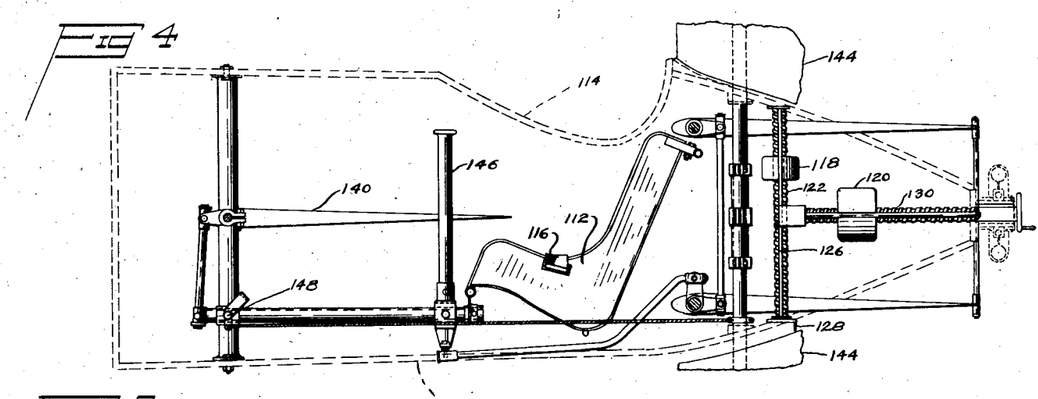
Figs. 4 and 5 are views in elevation and plan respectively of the interior arrangement of the fuselage which is shown in dotted lines, and with the control surfaces partially broken away.
Figure 5:
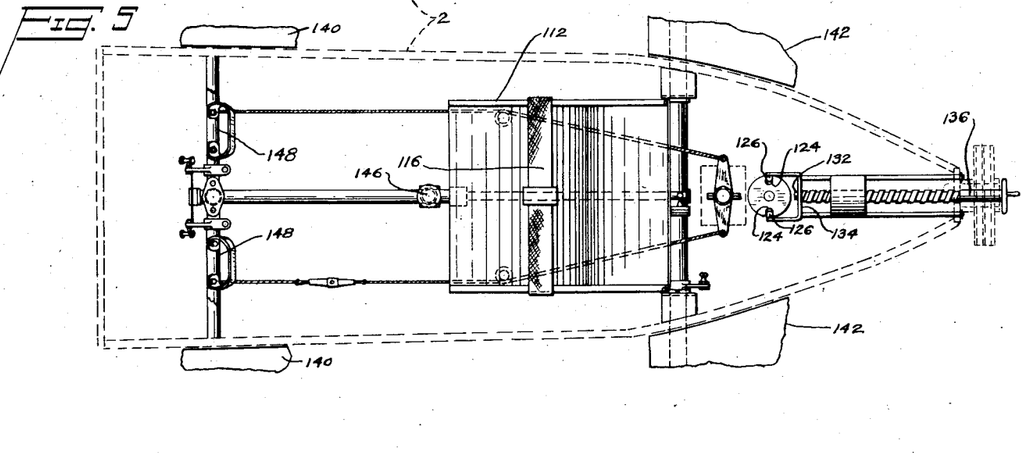

The various desired motions of fuselage about a fixed point of reference is obtained by use of the ailerons 140, the elevators 142 and the rudders 144 which are controlled in the usual and well-known manner such as a manual control stick 146 and a foot lever 148 and which are subject to the blast of air from the propeller. Figs. 4 and 5 show the arrangement of the surface controls. Rotation of the fuselage about the vertical axis is produced by the rudders 144 operated thru foot lever 148. The ailerons 140 placed on each side of the fuselage are controlled by a sidewise movement of the control stick 146 causing the ailerons to slope in opposite directions. Forward or rearward movement of the control stick will cause each set of elevators to pivot at the same time and in the same direction to upward or downward respectively.

For the purpose of obtaining a streamline effect of the fuselage a cowling 150 is formed integral with the inner ring 4 and is positioned directly in advance of the fuselage. The cowling comprises a plurality of metal ribs 152 that are fixed to a ring 154 at their inner ends and to a flat circular plate 156 at their outer ends. The plate 156 having an opening through which the shaft 94 may pass. The metal ribs are also welded intermediate of their ends to the ring members of the inner ring. Airplane fabric is used as covering for the fuselage frame and cowling frame.

To overcome the rotational effect of the air blast upon the fuselage, I provide an airstream straightener that is attached by suitable means welding or bolts and nuts (not shown) to the ring 154 and plate 156 of the motor housing. An airstream straightener is free from the fuselage and consists of a plurality of spaced apart vanes 228 that are radially disposed from the axes of rotation of the propeller and are braced against fluttering by means of suitable wire bracing 230.

By mounting the motor 82 on the inner gimbal ring 4 and independent of the fuselage 2 the counter torque of the motor has no effect upon the fuselage. This arrangement, however, does not prevent the rotation of the outer gimbal ring 6 set up by the counter torque of the motor when, as found by actual test, the axes of the motor lies substantially within 45 degrees either way from the vertical. It is also found that the outer gimbal ring is given an undesirable rotation by the gyroscopic effect set up by the running motor when there is a change of position of the axis of the motor due to a rotational movement of the inner gimbal ring. To overcome these undesirable conditions, I have provided a braking mechanism that will prevent the rotational movements due to counter torque and gyroscopic effect of the motor relative the supporting frame 8. The braking action is automatic in its operation. This is accomplished by providing a brake mechanism of well-known construction shown in Figs. 7 and 8 such as a brake drum 158 and friction band 160 fixed upon the truss 14 and outer gimbal ring 6 respectively and operating the band by a cam 162 Fig. 9 that is bolted to the shaft 58, and interconnected to the band 160 through a cable 164 and cam follower 166.

To support the brake drum and fixedly secure the same to the truss 14 I pass a shaft 168 having a spline 170 at its upper end and a reduced square-shaped portion 172 at its other end, into the hollow shaft 58 and provide suitable bearings 174 between the hollow shaft 58 and shaft 168 to prevent a binding or wedging action of the brake drum and friction band when the outer gimbal ring 6 and truss 14 are for any reason out of normal alignment. The square-shaped portion 172 of the shaft 168 is received within a complementary opening 176 in a plate member 178 that is bolted to the bearing support 32. The brake drum 158 is splined on the shaft 168 and retained against endwise movement by means of a lock nut 180.

Figures 3, 6, 7, 8:
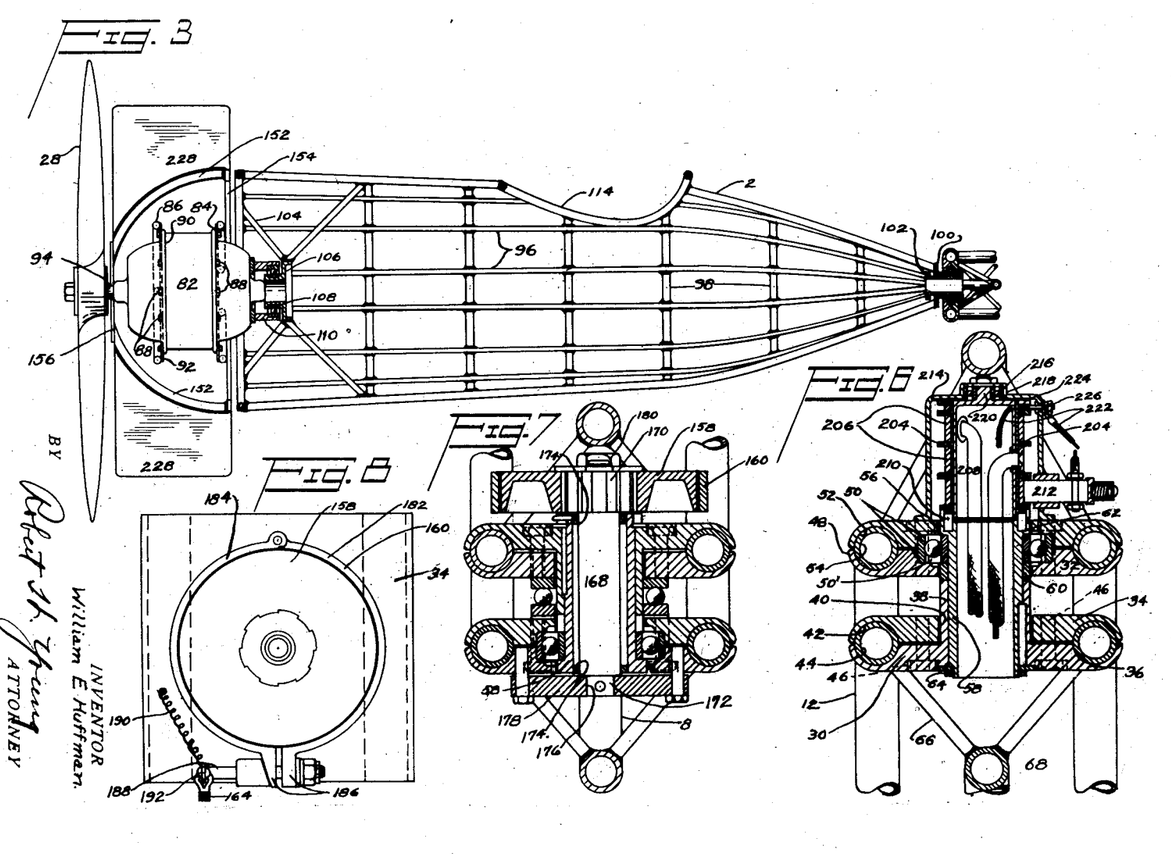
Fig. 3 is a sectional view taken on the line 3—3 of Fig. 2 showing in elevation the assembled relation of the fuselage and motor.
Figs. 6 and 7 are sectional views taken on the line 6—6 and 7—7 of Fig. 2 respectively.
Fig. 8 is a top plan view of the brake shown in Fig. 7.
Figure 9:
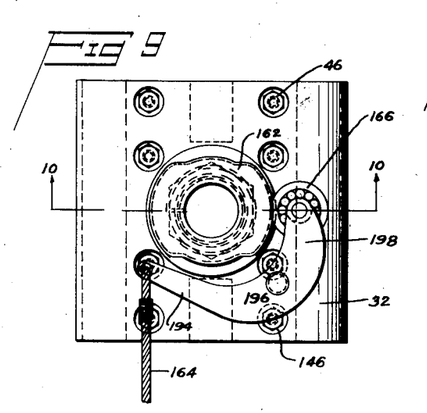
Fig. 9 is a detail view showing the brake actuating mechanism.
Figure 10:
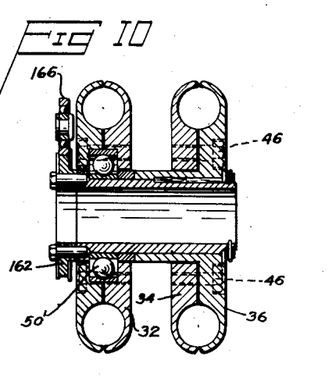
Fig. 10 is a sectional view taken on line 10—10 of Fig. 9.

The friction band 160 is made of two segments 182, 184 that are hinged together and mounted upon the journal support 30 so as to move with the outer gimbal ring. Each of these segments is formed with a lug 186 having aligned openings to receive an L-shaped lever 188 which is retained in released position as shown in Fig. 8 by a spring 190 secured to an arm of the lever 188 and to the journal support 30. The cable 164 passes around pulleys 192 attached to the outer gimbal ring and is secured to one arm 194 of a lever 196 pivoted to the journal support 32, the other arm 198 of said lever having rotatably mounted thereon the cam follower 166 to actuate the braking mechanism alternatingly for every 90 degrees of movement of the inner gimbal ring 4. As shown in Fig. 9 the cam is in normal position with the inner gimbal ring horizontally disposed. In moving this ring either clockwise or counterclockwise in a single circuit the outer gimbal ring will be free to rotate relative to the supporting frame 8 for the first 45 degrees of angular movement of the inner gimbal ring, will be locked against amount the next 90 degrees, free to rotate the following 90 degrees and locked against movement the next 45 degrees.

Electric current to actuate the motor 82 is obtained from a suitable source of electric energy as indicated by the mains 200 and is introduced to the motor by conductors 202 which are connected to a pair of commutators 204 carried by the inner gimbal ring and outer gimbal ring respectively.

As each of the commutators 204 are alike in construction a description of one will be sufficient for both. Referring to Fig. 6 contact rings 206 are fixed and insulated upon a tubular member 208 that is secured by means of dowel pins 210 to the shaft 58. The rubbing contacts 212 carried by the supporting member (the truss 14 as shown) are in permanent contact with the contact rings 206. A housing 214 for the commutator is fixed to the bearing support 32 and relative free movement between the tubular member 208 and housing 214 is obtained by interposing suitable bearings 216 between the flange 218 of the housing 214 and the stub shaft 220 made integral with the member 208.

Telephonic communication may be had with the student by providing a telephone (not shown) in the cockpit which may be connected to an outside telephone (not shown) through a conductor 222 comprising a slip ring 224 and a rubbing contact 226 for each of the commutators 206.

In operation the student takes his seat in the cockpit of the fuselage exactly in the same manner as on an ordinary flying machine ready to start. The electric motor is then turned on through the main switch or through an auxiliary switch that may be provided in the fuselage. Instead of the start at which the flying machine would commence to be lifted from the ground and would be suspended in the air subject to the action of the controls, the fuselage remains suspended within the gimbal ring support unable to advance but ready to take all the positions which the unarrested airplane would assume under the corresponding steering movements.

By the term rotate and its inflections I include and mean either a partial or whole rotation or rotations.

Having thus described my invention which I claim as new and desire to secure by Letters Patent is:

1. In a device of the class described, the combination of a support for a person, said support having aero-dynamic steering surfaces, an organization of pivoted means for mounting said support so as to have rotary movement in three planes at right angles to each other about a relatively fixed point of reference, and a motive power source mounted on said pivotal means independent of said support so that said support is rotatable independently thereof, said motive power source having a propeller operatively connected thereto and acting on said steering surfaces for moving said support at will in a clockwise or counter-clockwise direction and into a position in any plane passing through said point of reference.

2. In a device of the class described, the combination of a support for a person, said support being provided with selectively controlled steering surfaces, means for mounting said support so that it may have rotary movement about three intersecting axes, a motive power source mounted on said pivotal means independent of said support so that said support is rotatable independently thereof, said motive power source being in the plane of the longitudinal axis of said support, a propeller operatively connected to said motive power source for effecting an airstream to act on said steering surfaces and means for selectively controlling said surfaces for moving said support at will in a clockwise or counter-clockwise direction about any one or a combination of said axes.

3. A device of the class described, comprising means for supporting a person, said means having controllable surfaces for steering the same and being mounted for rotary movement in all planes passing through a relatively fixed point of reference to dispose the supported person in all positions from an upright to an inverted position, a motive power source mounted on said supporting means independent of said support so that said support may be rotated independently of said motive power source about an axis coincident with the axis of rotation of said propeller, a propeller operatively connected to said motive power source for effecting an airstream and means for straightening said airstream thereby preventing undesired rotation of said supporting means.

4. A device of the class described, comprising means for supporting a person, said means having controllable surfaces for steering the same and being mounted for rotary movement in all planes passing through a relatively fixed point of reference to dispose the supported person in all positions from an upright to an inverted position, a motive power source mounted on said supporting means independent of said support so that said support may be rotated independently of said motive power source about an axis coincident with the axis of rotation of said propeller, a propeller operatively connected to said motive power source for effecting an airstream and means fixedly secured to said motive power mount for straightening said airstream thereby preventing undesired rotation of said supporting means.

5. In a device of the class described, the combination of a support for a person, said support being provided with selectively controlled steering surfaces, means for mounting said support so that it may have rotary movement about three intersecting axes, a motive power source carried by said mounting means and bodily rotatable about two of said axes, means cooperating with said mounting means for preventing bodily rotation of said motor about one of said last-mentioned axes as the axis of rotation of said motor is moved into coincidence therewith, a propeller operatively connected to said motive power source adapted to effect an airstream longitudinally of said support and in the operating region of said steering surfaces, and means for selectively controlling said surfaces for varying at will the directional movement of said support about any one or a combination of said axes.

6. In a device of the class described, the combination of a support for a person, steering surfaces movable relative to said support, means for mounting said support so that it may have rotary movement about three intersecting axes, a motive power source mounted on said means independent of said support so that said support is rotatable independently thereof, a propeller operatively connected to said motive power source for effecting an airstream longitudinally of said support and in the operating region of said surfaces and means for selectively controlling said steering surfaces for varying at will the directional movement of said support about any one or a combination of said axes.

7. In a device of the class described, the combination of means for supporting a person in space so as to have rotary movement about a relatively fixed point of reference, said means being provided with steering surfaces, a motive power source carried by said supporting means having a propeller operatively connected thereto for effecting an airstream against said surfaces and means cooperating with said supporting means to prevent undesired rotation of said supporting means effected by the counter torque of said motive power source.

8. In a device of the class described, the combination with a gimbal ring construction comprising an outer member, an inner member and a fuselage rotatably supported by said inner member and being provided with steering surfaces for supporting one or more persons of a motive power source mounted on said inner member independent of said fuselage so that said fuselage is rotatable independently thereof and operatively connected to a propeller for effecting an airstream against said surfaces and means to control said surfaces for rotating said fuselage in any direction of rotation of said gimbal ring members.

9. In a device of the class described, the combination of a supporting member pivotally mounted to rotate about an axis, a motor mounted on said member and relatively fixed with respect thereto a fuselage provided with elevator surfaces and supported from said member to rotate independently of said member and relatively fixed with respect thereto, a propeller operatively connected to said motor to provide an airstream longitudinally of said fuselage in the operating region of said surfaces, and manual means for controlling said surfaces to be acted on by said airstream whereby said fuselage may be rotated about its axis in all positions of the same.

10. In a device of the class described, the combination of a member mounted to rotate about an axis, a fuselage rotatably supported from said member and adapted to support a person eccentrically with respect to said axis, said fuselage being provided with elevator surfaces, a motor on said member, a propeller operatively connected to said motor to provide an airstream against said surfaces and manual means for controlling said surfaces whereby the supported person may be revolved about said axis in all positions of said fuselage.

11. A device of the class described comprising a rotatable support for a person, a mounting for said support rotatable about an axis at right angles to the axis of rotation of said support, a motor supported by said mounting in such a manner that said motor and said support are capable of relative rotation and a propeller operatively connected to said motor for effecting an airstream longitudinally of said rotatable support.

12. A device of the class described comprising a rotatable support for a person, said support having controllable steering surfaces, a mounting for said support rotatable about an axis at right angles to the axis of rotation of said support, a motor supported directly by said mounting and independent of said support, a propeller operatively connected to said motor for effecting an airstream longitudinally of and against said steering surfaces and means to control said surfaces to thereby rotate said support about its axis in a clockwise or counter clockwise direction.

13. In a device of the class described, the combination of a support for a person, said support being provided with selectively controlled steering surfaces, means for mounting said support so that it may have rotary movement about its longitudinal axis, motive power means, and a propeller operatively connected thereto for effecting an airstream against said surfaces, said motive power means being mounted on said first mentioned means in such a manner that said support may be selectively rotated by means of said steering surfaces clockwise or counter clockwise about its axis relative to said motive power source.

14. In a device of the class described, the combination of a support for a person, said support being provided with selectively controlled steering surfaces, means comprising two members connected on the Cardan principle for mounting said support so that it may have rotary movement about two axes at right angles to each other, motive power means, and a propeller operatively connected thereto for effecting an airstream against said surfaces, said motive power means being mounted on said first mentioned means in such a manner that said support may be selectively rotated by means of said steering surfaces clockwise or counterclockwise about its axis relative to said motive power source.

15. In a device of the class described comprising a streamline rotatable support for a person, a mounting for said support rotatable about an axis at right angles to the axis of rotation of said support, a motor having a propeller operatively connected thereto for effecting an airstream longitudinally of said rotatable support, said motor being mounted directly on said mounting in such a manner that said support and motor are capable of relative rotation and a cowling for said motor attached to said mounting, said cowling projecting forwardly of said support and forming therewith a streamline surface.

16. In a device of the class described comprising a fixed support, a pair of members pivotally connected to each other and to said support for rotational movement about two axes at right angles to each other, a support for a person pivotally connected to the inner member and rotatable about an axis at right angles thereto, a motor mounted on said inner member and brake means cooperating with said outer member and fixed support to prevent rotational movement of said outer member when said inner member is rotated into the plane of said outer member.

17. In a device of the class described comprising a fixed support, a pair of ring members pivotally connected to each other and to said support for rotational movement about two axes at right angles to each other, a support for a person pivotally connected to the inner ring member and rotatable about an axis at right angles thereto, a motor mounted on said inner ring member and automatic brake means cooperating with said ring members and said fixed support for preventing rotational movement of said outer ring member when said inner ring member is rotated into the plane of said outer ring member.

18. In a device of the class described, the combination of means for supporting a person in space so as to have rotary movement about a relatively fixed point of reference, steering surfaces comprising a rudder member so disposed with respect to the longitudinal axis of said support as to provide substantially equal effective controlling surface areas on opposite sides of said fuselage, a motive power source mounted on said supporting means and having a propeller operatively connected thereto for effecting an airstream against said rudder member and means accessible from said support to control said rudder for rotating said support at will clockwise or counter clockwise about an axis at right angles to the longitudinal axis of said support.

19. In a device of the class described, the combination of a gimbal ring construction comprising an outer ring and an inner ring, a motive power source fixedly mounted on and rotatable with said inner ring, a seat for a person supported from said motor and rotatable independently thereof for supporting one or more persons, said seat being provided with control surfaces, a propeller operatively connected to said motive power source for moving said seat through said control surfaces in any direction at will, and means to substantially prevent undesirable rotation of said seat due to the counter torque of said motive power source.

20. In a device of the class described, the combination of an organization of pivotal means comprising a gimbal ring construction, a seat supported by the inner ring of said gimbal ring and adapted to support a person eccentrically to its axis of rotation so that the supported person may be revolved and rotated in one or more planes, or rotated in all planes passing through the pivotal axis of said inner ring, said seat being provided with control surfaces, a motive power source mounted on the inner ring of said gimbal ring construction and independent of said seat, a propeller operatively connected to said motive power source for effecting an airstream longitudinally of said seat in the operating region of said surfaces and means to control said surfaces for moving said seat in a clockwise or counter-clockwise direction in any plane passing through said point of reference.

21. In an apparatus having engine operated propelling means for effecting an airstream, a rotatable body, means carried by said body and adapted to be acted upon by said airstream for rotating said body, and means for directing said airstream against said second-mentioned means.

22. In a device of the class described, the combination of a support for a person, said support having steering surfaces, an organization of pivoted means for mounting said support so as to have rotary movement about at least two axes at right angles to each other about a relatively fixed point of reference, and power mechanism mounted on said pivoted means and separate from said support so that said support is movable independently thereof about one of said axes, said mechanism comprising a rotary propeller for effecting an air-stream against said surfaces and for causing the support to be rotated to an extent and in a direction corresponding to a given position of said surfaces.

23. A device of the class described comprising means for supporting a person in space and having selectively movable steering surfaces, a universal mounting for said support, a motive power source having a propeller operatively connected thereto supported by said mounting independent of said support and brake means cooperating with said mounting and said support so that said steering surfaces may move said support clockwise or counter-clockwise at will into any position permitted by said universal mounting by the action of the blast of said propeller against said surfaces.

24. In a device of the class described, the combination of a supporting member pivotally mounted to rotate about an axis, a motor mounted on said member and relatively fixed with respect thereto, a support provided with control surfaces supported by said motor, said support being rotatable independently of said member, a propeller operatively connected to said motor to provide an air-stream longitudinally of said fuselage in the operating region of said control surfaces, and manual means for controlling said surfaces to be acted on by said air-stream whereby said support may be rotated about its axis in all positions of the same.

25. A device of the class described, comprising means for supporting a person in space for movement about a point of reference, said means comprising a rotatable support, an inner rotatable member and an outer rotatable member, said inner and outer members being interconnected on the Cardan principle, and said support being rotatably mounted on said inner member, a motive power source mounted on the inner member and independent of said support so that said support is capable of rotation relative to said motive power source and having a propeller operatively connected thereto for effecting an air stream longitudinally of said inner ring, and steering surfaces movable relative to said supporting means and within the region of said air stream for varying at will the directional movement of said supporting means.

26. In a device of the class described, in combination, a support for a person, means for mounting said support so that said support may move about at least two intersecting axes, and a motive power source for effecting the actuation of said support about said axes, said motive power source being mounted for movement with said support about one of said axes, but free of movement with said support about the other of said axes.

27. In a device of the class described, in combination, a support for a person, means for mounting said support so that said support may move about three intersecting axes at right angles to each other, and a motive power source for effecting the actuation of said support about said axes, said motive power source being mounted for movement with said support about two of said axes, but free of movement with said support about the third of said axes.

28. In a device of the class described, in combination, a support for a person, means for mounting said support so that said support may move about three intersecting axes at right angles to each other, a motive power source for effecting the actuation of said support about said axes, said motive power source being mounted for movement with said support about two of said axes, but free of movement with said support about the third of said axes, and brake means carried by said mounting means and associated with said support to retard the motion of said support about one of said two axes as the third axis moves into coincidence therewith.

29. In a device of the class described comprising a fixed support, a pair of members pivotally connected to each other and to said support for rotational movement about two axes at right angles to each other, a support for a person pivotally connected to the inner member and rotatable about an axis at right angles thereto, a motor mounted on said inner member and brake means cooperating with said outer member and fixed support to prevent rotational movement of said outer member.

30. In a device of the class described comprising a fixed support, a pair of members pivotally connected to each other and to said support for rotational movement about two axes at right angles to each other, a support for a person pivotally connected to the inner member and rotatable about an axis at right angles thereto, a motor mounted on said inner member and brake means cooperating with said outer member and fixed support and including brake actuating means associated with said inner member to prevent rotational movement of said outer member when said inner member is rotated into the plane of said outer member.

31. In a device of the class described comprising a fixed support, a pair of members pivotally connected to each other and to said support for rotational movement about two axes at right angles to each other, a support for a person pivotally connected to the inner member and rotatable about an axis at right angles thereto, a motor mounted on said inner member and brake means cooperating with said outer member and fixed support and brake actuating cam means operatively connected to said inner member to prevent rotational movement of said outer member when said inner member is rotated into the plane of said outer member.

In testimony whereof, I affix my signature.

WILLIAM E. HUFFMAN.